(12) United States Patent
Zecha et al.

(10) Patent No.: US 6,552,115 B1
(45) Date of Patent: Apr. 22, 2003

(54) VINYL ACETATE BASED POLYMER LATEX COMPOSITION, ESPECIALLY FOR ADHESIVES

(75) Inventors: Helmut Zecha, Burghausen (DE); Rudolf Weissgerber, Burghausen (DE); Frank Geiger, Burghausen (DE)

(73) Assignee: Air Products Polymers, L.P., Allentown, PA (US)

( * ) Notice: Subject to any disclaimer, the term of this patent is extended or adjusted under 35 U.S.C. 154(b) by 163 days.

(21) Appl. No.: 09/690,422

(22) Filed: Oct. 17, 2000

(30) Foreign Application Priority Data

Jul. 7, 2000 (EP) ............................................. 00114097

(51) Int. Cl.$^7$ .................................................. C08F 2/16
(52) U.S. Cl. ....................... 524/457; 524/458; 524/459; 524/503; 524/803
(58) Field of Search ................................ 524/457, 458, 524/503, 803, 459; 525/58, 61

(56) References Cited

U.S. PATENT DOCUMENTS

| | | | |
|---|---|---|---|
| 4,118,357 A | 10/1978 | Brabetz et al. | 260/29.6 WA |
| 5,182,328 A | 1/1993 | Iacoveillo et al. | 524/803 |
| 5,296,532 A | 3/1994 | Haerzschel et al. | 524/398 |
| 5,391,608 A | 2/1995 | Mudge et al. | 524/459 |
| 5,416,140 A | 5/1995 | Columbus et al. | 524/13 |
| 5,434,216 A | 7/1995 | Mudge et al. | 524/803 |
| 5,439,960 A | 8/1995 | Mudge et al. | 524/111 |

FOREIGN PATENT DOCUMENTS

| | | |
|---|---|---|
| EP | 0501174 | 6/1996 |
| EP | 0623661 | 1/2000 |
| JP | 06279644 | 10/1994 |
| JP | 06322337 | 11/1994 |
| JP | 07011217 | 1/1995 |

*Primary Examiner*—Edward J. Cain
(74) *Attorney, Agent, or Firm*—Mary E. Bongiorno; Russell L. Brewer

(57) ABSTRACT

The present invention relates to a vinyl acetate based polymer latex composition obtained by emulsion polymerization, the polymer comprising PVOH, and a monomer mixture, said monomer mixture comprising vinyl acetate, and a pre-crosslinking monomer selected from one or more polyethylenically unsaturated compounds wherein said pre-crosslinking monomer is present in amount of less than 0.01% by weight based on the total monomer content and which pre-crosslinking monomer is initially charged to the polymerization reaction mixture. The invention further relates to use of the vinyl acetate based polymer latex in an adhesive, preferably a woodworking adhesive and to an adhesive, preferably a woodworking adhesive comprising said latex.

18 Claims, 3 Drawing Sheets

VINYL ACETATE BASED POLYMER LATEX COMPOSITION, ESPECIALLY FOR ADHESIVES

BACKGROUND OF THE INVENTION

Polymer emulsions or polymer latices prepared by conventional emulsion homo- or co-polymerization of vinyl acetate using polyvinyl alcohol as protective colloid are widely used for adhesives. There are several application fields for such emulsions such as in wood glues, paper and packaging adhesives (e.g. case sealing, book binding, bag making, card board lamination), parquet adhesives and others, most importantly woodworking adhesive formulations.

All these adhesives and especially woodworking adhesives are optimized with respect to several properties such as water resistance of the bond, heat resistance of the bond and creep of the bond. Further, before application several dispersion properties must be met. These are compatibility with formulation aids such as film forming agents, fillers, metal salts; theological properties; storage stability; the speed of set and so on.

Vinyl acetate based polymer latices for woodworking adhesives having good water resistance typically use some functional post-crosslinking comonomer in polymerization and the formulation with a catalyst after polymerization. Amongst the post-crosslinkers N-alkylol derivatives of an amide of an α,β-ethylenically unsaturated carboxylic acid, such as N-methylol acrylamide (NMA) which is preferred for latex wood glues are known. For example, U.S. Pat. No. 5,439,960 and U.S. Pat. No. 5,391,608 describe the use of 0.1 to 6% of NMA based on total monomer content. Likewise European Patent Application EP-A-0,561,221 describes the use of 2 to 10% NMA.

As the catalyst for formulation of the above woodworking adhesives having good water resistance water-soluble metal salts of monobasic acids such as aluminum(III), iron(III) and/or zirconium(IV) salts, especially aluminum nitrate, iron chloride or zirconium oxy-chloride are used (see for example DE-26,20,738, EP-A-0,433,957, EP-A-0,501,174, EP-A-0,686,683 and U.S. Pat. No. 5,434,216).

Another approach to improve water resistance of wood glues is for example disclosed in EP-A-0,433,957, EP-A-0,623,661 and JP-06,322,337 which documents relate to use of more hydrophobic comonomers such as vinyl pivalate, diisopropyl maleate, diisopropyl fumarate, vinyl chloride or versatic acid vinyl esters for this purpose.

U.S. Pat. No. 5,296,532 discloses a vinyl ester graft copolymer comprising 2 to 12% by weight of one or more polyvinyl alcohols and 88 to 98% by weight of a graft monomer mixture. The graft monomer mixture comprises 5 to 50% by weight of a saturated aliphatic highly branched mono-carboxylic acid having 9 to 10 carbon atoms, 50 to 95% by weight of a vinylic ester having 1 to 18 carbon atoms in the ester residue, and 0.01 to 4% by weight of a copolymerizable polyethylenically unsaturated monomer such as divinyl adipate, triallyl cyanurate or diallyl maleate. The graft copolymer may further comprise up to 26% by weight of other monoethylenically unsaturated monomers. The document examplifies a vinyl acetate based woodworking adhesive or wood glue comprising 0.03% triallyl cyanurate.

U.S. Pat. No. 5,391,608 and 5,439,960 disclose a two-stage emulsion polymerization procedure to obtain a graft copolymer according to which two-stage process in the first stage vinyl acetate is emulsion polymerized with 0.1 to 6% by weight of a post-crosslinking monomer in the presence of polyvinyl alcohol and in the second stage methyl methacrylate is emulsion polymerized with 0.1 to 6% by weight N-methylol acrylamide and 0.01 to 0.5% by weight triallyl cyanurate or diallyl maleate to obtain the outer shell of the graft polymer.

Adhesive performance of for example a wood glue is typically controlled by the amount of polyvinyl alcohol, i.e. the ratio of polyvinyl alcohol to monomer, the polyvinyl alcohol molecular weight and its degree of hydrolysis as for example disclosed in U.S. Pat. No. 5,434,216. In addition, functionalized polyvinyl alcohols, e.g. acetoacetylated polyvinyl alcohols (JP-A-06,279,644) or itaconic acid-modified polyvinyl alcohols (JP-A-07,11,217) may be used.

The choice of the polyvinyl alcohol (PVOH) in turn determines other properties of the vinyl acetate latex and thus the adhesive obtained, especially its rheological properties such as viscosity and shear thinning, or the speed of set. Rheology thus will mainly depend on the molecular weight distribution and degree of hydrolysis of the polyvinyl alcohol used. For example, EP-A-0,686,683 discloses altering the theological properties by altering the formulation with some thickening agent, thereby changing the continuous phase viscosity.

None of the above techniques allows for a simple straight forward independent control of these properties. It is therefore the object of the present invention to find a possibility for independent control of the shear thinning and speed of set, which in turn allows to precisely and intentionally adapt the emulsion or latex for certain applications thereby improving performance of for example a woodworking adhesive or wood glue.

Nevertheless, it would be especially useful and desirable to provide a certain shear thinning behavior and to improve the speed of set. At the same time, however, the viscosity level should remain more or less unchanged like the other useful adhesive performance parameters, created e.g. by the level of NMA comonomer or other comonomer and/or by the molecular weight and hydrolysis distribution of the PVOH protective colloid.

BRIEF SUMMARY OF THE INVENTION

The above object is solved and the drawbacks of the prior art are overcome according to a first aspect of the invention by a vinyl acetate based polymer latex composition obtained by emulsion polymerization, the polymer comprising (i) PVOH, and (ii) a monomer mixture, said monomer mixture comprising (a) vinyl acetate, and (b) a pre-crosslinking monomer selected from one or more polyethylenically unsaturated compounds wherein said pre-crosslinking monomer is present in amount of less than 0.01% by weight based on the total monomer content and which pre-crosslinking monomer is initially charged to the polymerization reaction mixture.

The vinyl acetate based polymer latex composition may further comprise a post-crosslinking monomer as well as other copolymerizable monomer selected from vinylic esters, acrylic monomer, carboxylic acid and ethylene.

In a second aspect, the present invention relates to an adhesive comprising a vinyl acetate based polymer latex composition obtained by emulsion polymerization, the polymer comprising (i) PVOH, and (ii) a monomer mixture, said monomer mixture comprising (a) vinyl acetate, and (b) a pre-crosslinking monomer selected from one or more polyethylenically unsaturated compounds wherein said pre-crosslinking monomer is present in amount of less than 0.01% by weight based on the total monomer content and which pre-crosslinking monomer is initially charged to the polymerization reaction mixture, (c) further optionally comprising a post-crosslinking monomer, up to 40% by weight of other vinylic esters, up to 15% by weight of acrylic monomer, up to 3% by weight of unsaturated carboxylic acid, and up to 20% by weight of ethylene, all percentages being based on total monomer content, optionally in combination with appropriate additives. Preferably the adhesive is a woodworking adhesive.

According to a third aspect, the present invention relates to use of the above vinyl acetate based polymer latex composition optionally in combination with appropriate additives in an adhesive, preferably a woodworking adhesive.

DETAILED DESCRIPTION OF THE INVENTION

Figure 1:
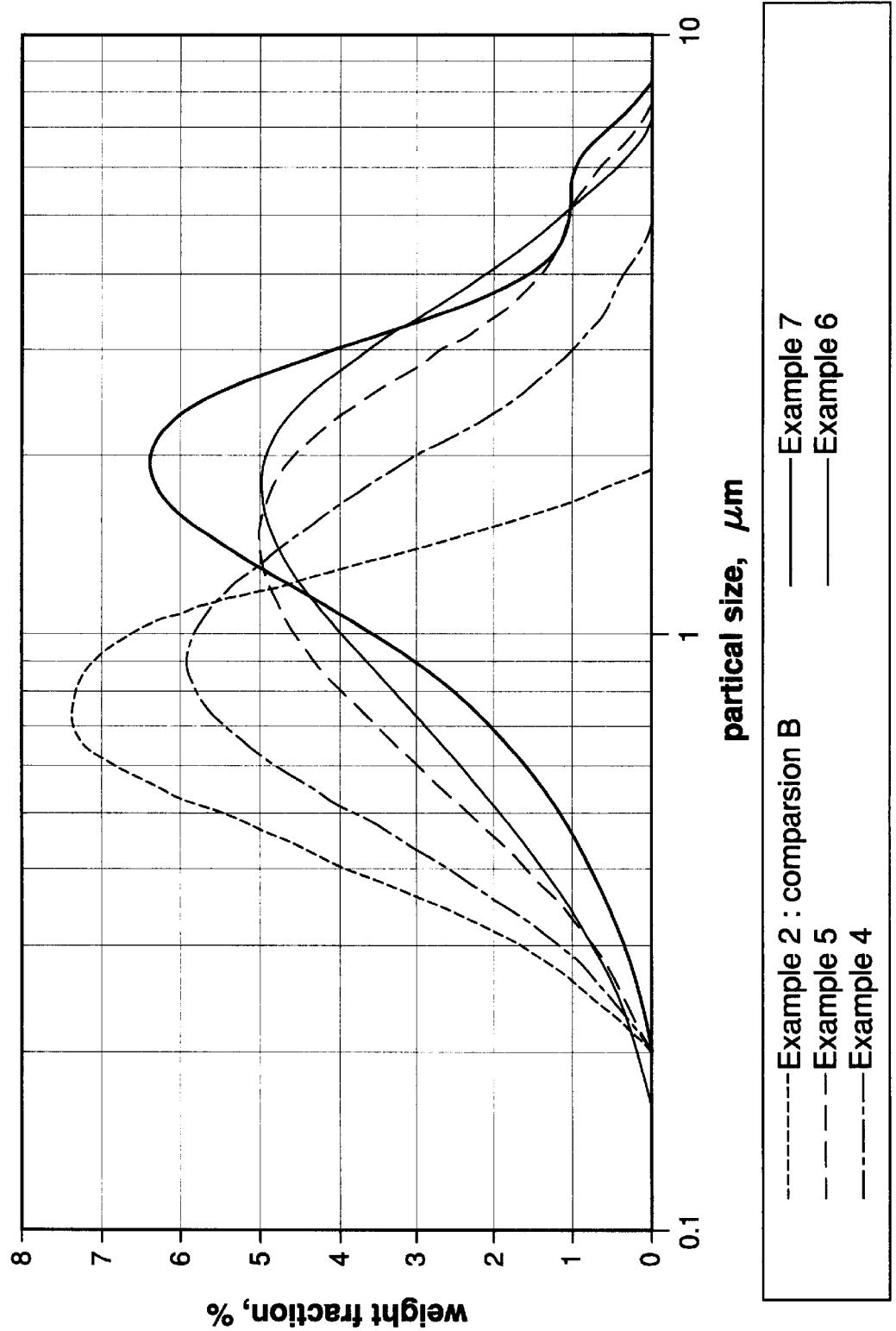
FIGS. 1 and 2 are graphs showing the volume density distribution functions of particle size for the latices obtained by use of AMA and TAC as the pre-crosslinking monomer, respectively.

The present invention is based on the surprising finding that the Theological properties such as shear thinning and speed of set of a vinyl acetate based polymer latex prepared by conventional emulsion polymerization using PVOH as a protective colloid can be shifted without substantially changing the viscosity level, by polymerizing the vinyl acetate in presence of a small amount (less than 0.01% by weight based on total monomer content) of a pre-crosslinking monomer of the polyethylenically unsaturated type. Other important adhesive properties remain unchanged, whereas the shear thinning of the adhesive obtained from the above vinyl acetate based polymer latex composition is advantageously lowered and its speed of set increased.

The present invention according to its first aspect thus relates to a vinyl acetate based polymer latex composition obtained by emulsion polymerization, the polymer comprising (i) PVOH, and (ii) a monomer mixture, said monomer mixture comprising (a) vinyl acetate, and (b) a pre-crosslinking monomer selected from one or more polyethylenically unsaturated compounds wherein said pre-crosslinking monomer is present in amount of less than 0.01% by weight based on the total monomer content and which pre-crosslinking monomer is initially charged to the polymerization reaction mixture.

The polymer latex of the invention comprises vinyl acetate as the base monomer. Vinyl acetate is used in an amount of 99.9 to 60.0% by weight, based on total monomer content. Preferably, the amount of vinyl acetate used is in the range of 99.5 to 80% by weight.

Other vinyl esters may be used in combination with vinyl acetate. Examples of such other vinyl esters are vinyl propionate, vinyl pivalate, vinyl laurate, vinyl 2-ethyl hexanoate, dibutyl maleate, dioctyl maleate, diisopropyl maleate, diisopropyl fumarate, versatic acid vinyl esters having 9 to 12, preferably 9 or 10 carbon atoms, or mixtures thereof. The amount of other vinyl esters, if used, is in the range of up to 40.0% by weight, based on total monomer content, preferably 5 to 30% by weight.

As put forth above, the pre-crosslinking monomer or monomers which have to be present during the vinyl acetate base monomer polymerization is/are selected from one or more polyethylenically unsaturated compounds or mixtures of such compounds. Preferably the pre-crosslinking monomer is selected from the group consisting of decadiene, vinyl crotonate, diallyl phthalate, divinyl adipate, methylene bis (meth)acrylamide, triallyl cyanurate (TAC), butanediol di(meth)acrylate, hexanediol di(meth)acrylate, pentaerythritol tri(meth)acrylate, pentaerythritol di(meth)acrylate, triethylolpropane tri(meth)acrylate, triethylolpropane di(meth) acrylate, divinyl dimethylsilane, divinyl diethylsilane, triethylene glycol di(meth)acrylate, allyl(meth)acrylate and mixtures thereof. More preferably, the pre-crosslinking monomer is selected from allyl methacrylate, triallyl cyanurate and mixtures thereof, most preferably allyl methacrylate (AMA).

The pre-crosslinking monomer is used in an amount of less than 0.01% by weight based on total monomer content. If used in an amount of 0.01% by weight or more, the speed of set is reduced considerably. Further, if used in amounts of 0.01% or more the advantage of a lowered shear thinning may begin to disappear and may even be shifted to an actual shear thickening resulting in undesirable dilatancy of the polymer latex or of the adhesive obtained.

On the other hand, the pre-crosslinking monomer of the invention is preferably used in an amount of at least 0.0002% by weight based on total monomer content, since the desired effect of decreased shear thinning may not be sufficiently achieved with lower amounts, although it may still be noticable. Preferably the pre-crosslinking monomer is used in an amount of 0.0002% by weight to less than 0.01% by weight, based on total monomer content, more preferably 0.0002 to 0.009% by weight and most preferably 0.0005 to 0.009% by weight.

The pre-crosslinking monomer is at least partially, if not entirely added to the initial reactor charge or the initial polymerization reaction mixture such that the vinyl acetate is polymerized in its presence from the beginning of the reaction on.

The vinyl acetate based polymer latex of the invention, particular if designed for wood glues, may further comprise a post-crosslinking monomer selected from the group consisting of N-alkylol derivatives of an amide of an α,β-ethylenically unsaturated carboxylic acid and mixtures thereof. Preferably the post-crosslinking monomer is selected from the group consisting of $N-C_{1-3}$-alkylol (meth) acrylamides, preferably N-methylol (meth)acrylamide, $N-C_{1-3}$-alkylol melamides, preferably N-methylol melamide, $N-C_{1-3}$-alkylol melamic acid and their esters, preferably N-methylol melamic acid, N-methylol melamic acid ester, $N-C_{2-5}$-acylol amides of vinylaromatic acids, $N-C_{1-4}$-alkoxymethyl (meth)acrylamide, and mixtures thereof. More preferably, the post-crosslinking monomer is N-methylol acrylamide (NMA).

With the term "(meth)acryl . . . " as used herein both the respective acrylic acid derivatives and the methacrylic acid derivatives are referred to. Thus, "N-methylol (meth)acrylamide" refers to both N-methylol acrylamide and N-methylol methacrylamide. The above $C_{1-3}$ or $C_{1-4}$ alkyl residues include methyl, ethyl, n-propyl, i-propyl, n-, i-, and t-butyl residues and may be chosen independently from each other.

The post-crosslinking monomer is preferably comprised in the vinyl acetate based polymer latex composition of the invention in an amount of 0.1 to 5.0% by weight based on the total monomer content. The post-crosslinking monomer or mixtures of such monomers is known to be essential for sufficient water and heat resistance of the bond. Use of such post-crosslinking monomer or monomer mixtures is therefore preferred. It is, however, not necessary to achieve the effects of the invention. Therefore, although preferred, the post-crosslinking monomer is not an essential component of the claimed latex composition.

The vinyl acetate based polymer latex composition of the invention may further comprise one or more polymerizable comonomers selected from (a) up to 40% by weight another vinylic ester, (b) up to 15% by weight acrylic monomer, (c) up to 3% by weight unsaturated carboxylic acid, and (d) up to 20% by weight ethylene, all percentages being based on total monomer content.

The other vinylic ester to be optionally used as a comonomer in combination with the vinyl acetate base monomer has been described above. The acrylic monomer to be optionally comprised in the vinyl acetate based polymer latex composition of the invention may for example be selected from the group consisting of $C_{1-8}$-alkyl acrylates such as ethyl acrylate, butyl acrylate, 2-ethyl hexyl acrylate or mixtures thereof. The acrylic monomer is preferably used in an amount of less than 15% by weight based on total monomer content, more preferably in an amount of 1 to 10% by weight.

The above unsaturated carboxylic acid as the comonomer is an ethylenically unsaturated acid and may be selected from the group consisting of acrylic acid, methacrylic acid, crotonic acid, itaconic acid, maleic acid, fumaric acid, their anhydrides such as maleic acid anhydride, and mixtures thereof. If used, the amount of the ethylenically unsaturated carboxylic acid or their mixtures is 0.1 to 3.0% by weight, preferably 0.5 to 2.0% by weight, based on total monomer content.

The vinyl acetate based polymer latex composition may further comprise up to 20% by weight ethylene, preferably 1 to 20% by weight ethylene based on total monomer contents. In a preferred embodiment, the vinyl acetate based polymer latex composition, which may optionally comprise the above post-crosslinking monomer, comprises one or both of 1 to 20% by weight ethylene and 1 to 30% by weight vinyl ester as the copolymerizable comonomers, provided the total amount of copolymerizable comonomer does not exceed 1 to 40% by weight.

The colloidal stabilizer used in the vinyl acetate based polymer latex compositions of the invention is polyvinyl alcohol (PVOH). Various suitable polyvinyl alcohols are known to the skilled worker and are readily available. Especially preferred is a partially hydrolyzed PVOH having a degree of hydrolysis from 60 to 99 mol %, preferably from 85 to 97 mol %, most preferably 92 to 94 mol %. However, to achieve the desired viscosity level of the polymer latex and to allow for good adhesion performance of the bond, blends of different PVOH grades possessing different molecular weights and hydrolysis distributions may be used. The colloidal stabilizer PVOH is typically used in an amount of 3 to 15% by weight, based on the total weight of the composition, more preferably 4 to 8% by weight.

As put forth above, the PVOH is typically chosen to provide suitable adhesive performance, whereas the rheological properties of the adhesive are likewise determined by the choice of the PVOH and are accepted as such.

Little attention has so far been paid to the control of the particle sizes or particle size distribution of polyvinyl alcohol (PVOH) stabilized vinyl acetate copolymer latices suitable for water resistant wood glues. On the other hand it is well-known to the skilled worker that particle size distribution itself does have significant influence on the viscosity and all rheological properties, such as shear thinning behavior. It is also well known that several parameters related to the overall recipe or to the polymerization process may be used to alter the particle size distribution. Nevertheless changing the overall recipe especially with respect to the PVOH used and/or the polymerization process may be detrimental for the adhesive performance as well. For example, the use of some emulsifier or some electrolyte to produce different particle sizes would cause slower setting speeds of the adhesive and lower water resistance of the bond. Changing the amount and composition of the polyvinyl alcohol protective colloid may result in an increased particle size. However, knowing that the PVOH characteristics may be used as a key to control the adhesive performance this change is also very likely to deteriorate adhesive performance.

The present invention overcomes these problems in that it provides for an independent adjusting of shear thinning or speed of set. Without wishing to be bound by theory it is assumed that this is achieved by an increase of latex particle sizes obtained by polymerizing the vinyl acetate base monomer in presence of less than 0.01% by weight based on total monomer content of the pre-crosslinking monomer, at which surprisingly the viscosity level is maintained despite the formation of larger particles.

The theological properties such as shear thinning behavior are e.g. known to depend on the volume fraction of the dispersed particles, on their size distribution and on the continuous phase rheology. Especially an increase of particle sizes will reduce shear thinning and thus provide for a more Newtonian-like theological behavior. The particle size or particle size distribution of the polymer latex is according to the invention independently controlled by use of the pre-crosslinking monomer in an amount of less than 0.01% by weight without affecting other properties such as viscosity. Especially this reduction of shear thinning due to the creation of larger particles and at the same time maintenance of viscosity levels seemed, however, to be impossible.

The polymer latex particles may be co-stabilized by use of emulsifiers, if needed for example for further viscosity control. These emulsifiers are known to the skilled worker and can be included as usual. Preferably, non-ionic emulsifiers such as polyoxyethylene ethers or fatty alcohols may be used, preferably in an amount of 0.1 to 1.0% by weight, based on total monomer content.

The vinyl acetate based polymer latex composition of the invention is obtained by conventional emulsion polymerization. Conventional batch or semi-batch emulsion polymerization procedures may be employed. Mainly for safety reasons and in view of the amount of heat to be dissipated, the semi-batch procedure is preferred. In case of a semibatch procedure a certain fraction of the reactants together with some water, if desired, and some of the polyvinyl alcohol solution as well as emulsifier solution, if used, is initially charged to the reactor.

It is, however, required that at least part, if not all of the pre-crosslinking monomer is included in the initial reaction mixture, i.e. is initially charged to the reactor. This assures that the vinyl acetate base monomer is polymerized in presence of the pre-crosslinking monomer from the beginning of the reaction on.

The reaction may be started by feeding an aqueous solution of the initiator or initiator components. Preferred initiation of the emulsion polymerization of the invention is carried out by a redox reaction using a redox system of an oxidant and a reductant in suitable amounts, the amount of initiator components to provide complete conversion depending on the selected initiator of the redox system. Typical oxidants are selected from the group of organic hydroperoxides such as t-butyl hydroperoxide (tBHP), inorganic persulfates such as sodium persulfate, potassium persulfate and ammonium persulfate. Other organic peroxides may be used as well either alone or in combination therewith. Typical reductants are the sulfoxylates such as sodium formaldehyde sulfoxylate (SFS), sulfites such as sodium sulfite, sodium hydrogen sulfite, dithionites such as sodium dithionite, and organic reductants such as ascorbic acid and its derivatives. Preferred combinations are t-butyl hydroperoxide and sodium formaldehyde sulfoxylate (optionally in the presence of traces of ferro ammonium sulfate), t-BHP/sodium sulfite, t-BHP/sodium hydrogen sulfite, t-BHP/sodium dithionite and t-BHP/ascorbic acid.

Preferably, initiation of the emulsion polymerization is carried out by t-BHP/SFS in the presence of traces of ferro ammonium sulfate. The initiator is used in suitable amounts to provide complete conversion of the monomers. In case of the preferred initiation system typically less than 0.015% by weight t-BHP, based on total monomer content, for the course of the polymerization and less than 0.15% by weight t-BHP, based on total monomer content, for postpolymerization to reduce the residual monomer content below 50 ppm, based on the emulsion, is used. Molar ratios of the SFS are used during the course of the polymerization, typically, but are not desired.

Furtheron, the remaining fractions of the reactants, the PVOH solution as well as the emulsifier solution, if used, and extra water, if needed, are fed over a certain period of time to the reaction vessel. Feeding rates will typically be kept constant over the feeding time, but may also vary, if desired. Typical reaction times depend on the reaction temperature and are typically within the range of 2 hours to 8 hours, preferably 4 hours to 6 hours.

The polymerization reaction of the invention is preferably performed at a temperature ranging from 50 to 90° C., preferably between 63 and 73° C., during most of the reaction time. Care has to be taken that an appropriate mixing of the components occurs in the reaction vessel. Mixing is achieved by conventional means known to the skilled worker.

Initial reactor charges and procedure can be chosen as needed, provided at least part of the pre-crosslinking monomer is included in the initial reactor charge.

The initiator components will be fed to the reactor during all the reaction time, even after the feeding of reactants is finished until nearly complete conversion is reached. The initiator feeding rate may be kept constant or may vary over the time. For post-polymerization which is preferably carried out to reduce residual monomer content below 50 ppm based on the latex, more concentrated solutions of initiator components (preferably t-BHP/SFS) are fed to the latex. Finally the latex is cooled to ambient temperature.

The final solid content of the latex is preferably in a range of 45 to 60% by weight, based on aqueous latex, more preferably between 50 and 55% by weight.

Final latex viscosity at 50% solids by weight will be between 5,000 and 30,000 mPas, mainly but not only depending on the type and amount of polyvinyl alcohol used. Viscosity is measured using a Brookfield viscometer at 20 rpm with spindle #6 at 23° C.

The vinyl acetate based polymer latex composition of the invention thus obtained may be formulated into an adhesive by conventional means. Optionally such adhesive may comprise suitable additives known to the skilled worker. Examples of such additives are film forming agents; water-soluble metal salts of monobasic acids such as aluminum, iron and/or zirconium salts; free mineral acids such as hydrochloride acid, nitric acid, perchloric acid, phosphoric acid or mixtures thereof and antifoam agents.

The adhesives of the invention are characterized by a preferable setting speed in the range of 6.5 N/mm$^2$ or above, appropriate water resistance, appropriate heat resistance; appropriate viscosity and a shear thinning factor in the range of 0.1 to 0.4, calculated from the viscosity at 1 and 10 rpm at 23° C., viscosity being measured with a Brookfield viscometer, spindle #6 at 23° C.

The following examples are given to further illustrate the present invention, but are not intended to limit the same.

EXAMPLES

All examples given below were executed in a 3l glass reactor, equipped with electronic temperature measurement and control, reflux condenser, and metering pumps for at least four different for parallel feeding. Mixing was done using an anchor-type stirrer at 150 rpm, constantly. The ingredients of the recipe were distributed among initial reactor charge, feed 1, feed 2, feed 3, feed 4, and feed 5 and 6, if applied. The initial reactor charge was heated and feed 1 and 2 were started at approximately 55° C. to initiate the reaction. Feed 3 and 4 were started at 65° C. and were metered in during 3 hours. Reaction temperature was maintained between 65 and 70° C. during the addition of feed 3 and 4. It was 70° C. for the last hour where the remaining feed 1 and 2 were added completely after feed 3 and 4 were completed. Total reaction time was about 4.5 hours. The free monomer content based on latex after the start of feeds 3 and 4 was controlled by appropriate addition rates for feeds 1, 2, 3, and 4 to be between 5 to 15%. Feed 5 and 6, if applied, are added after feeds 1 and 2 have been completed.

Example 1 (Comparison A)

Vinyl Acetate/VeoVa9/NMA—Adhesive Without Polyethylenically Unsaturated Monomer

The initial reactor charge consisted of 34.93 parts of a 10% PVOH solution, the PVOH having a degree of hydrolysis of 92% and a solution viscosity of 25 mPas at 23° C. for a 4% solution, 11.44 parts of a monomer solution containing 90% VAC and 10% of VeoVa9 (the latter is a commercial product of Shell), 0.23 parts of a 1% ferro ammonium sulfate solution and 0.31 parts of water.

Feed 1 consisted of 5.84 parts of a 1% tBHP solution and feed 2 of 5.84 parts of a 1.7% SFS solution. Feed 3 consisted of 34.32 parts of monomer solution containing 90% VAC and 10% of VeoVa9, and feed 4 of 1.21 parts of a 48% NMA solution together with 5.88 parts of water.

No other feeds were applied. The resulting latex (100 parts) provides a solid content of 50% for 100% monomer conversion. Reaction was executed as given above.

Example 2 (Comparison B)

Vinyl Acetate/NMA—Wood Glue Without Polyethylenically Unsaturated Monomer

Initial reactor charge consisted of 34.93 parts of a 10% PVOH solution, 11.44 parts of monomer VAC, 0.23 parts of a 1% Ferro ammonium sulfate solution and 0.31 parts of water.

Feed 1 consisted of 5.83 parts of a 0.1% BHP solution and feed 2 of 5.83 parts of a 0.17% SFS solution. Feed 3 consisted of 34.32 parts of monomer VAC and feed 4 of 1.21 parts of a 48% NMA solution together with 4.48 parts of water. Feed 5 consisted of 0.53 parts of a 10% tBHP solution and feed 6 of 0.89 parts of a 10% SFS solution.

The resulting latex (100 parts) provides a solid content of 50% for 100% monomer conversion. Reaction was executed as given above.

Example 3

Vinyl Acetate/VeoVa/NMA—Adhesive With 50 ppm TAC

The same procedure as in example 1 was followed with the exception that 50 parts per million (ppm) of triallyl cyanurate monomer (TAC) based on total monomer were added to the initial reactor charge.

Example 4

Vinyl Acetate/NMA—Wood Glue With 10 ppm AMA

The same procedure as in example 2 was followed with the exception that 10 ppm of allyl methacrylate (AMA) based on total monomer were added to the initial reactor charge.

Example 5

Vinyl Acetate/NMA—Wood Glue With 50 ppm AMA

The same procedure as in example 2 was followed with the exception that 50 ppm of allyl methacrylate (AMA) based on total monomer were added to the initial reactor charge.

Example 6

Vinyl Acetate/NMA—Wood Glue With 75 ppm AMA

The same procedure as in example 2 was followed with the exception that 75 ppm of allyl methacrylate (AMA) based on total monomer were added to the initial reactor charge.

Example 7

Vinyl Acetate/NMA—Wood Glue With 90 ppm AMA

The same procedure as in example 2 was followed with the exception that 90 ppm of allyl methacrylate (AMA) based on total monomer were added to the initial reactor charge.

Example 8 (Comparison C)

Vinyl Acetate/VeoVa/NMA—Adhesive With 300 ppm TAC

The same procedure as in example 1 was followed with the exception that 11.3 parts of the monomer solution added to the initial reactor charge had following composition: 80% VAC, and 20% VeoVa9. The same monomer composition was applied in feed 3. Additionally 300 ppm triallyl cyanurate (TAC) based on total monomer were added to the initial reactor charge.

Example 9 (Comparison D)

Vinyl Acetate/NMA—Wood Glue With 300 ppm AMA

The same procedure as in example 2 was followed with the exception that 300 ppm of allyl methacrylate (AMA) based on total monomer were added to the initial reactor charge.

Test Methods

Latex Particle Size

Latex particle size distributions were obtained using the Coulter LS230 (Coulter Corporation, Miami, Fla. 33196) for the appropriate diluted latex samples. Results given below refer to the volume density distribution function of particle size (FIGS. 1 and 2) and to the median or central value of the volume distribution function $x_{3.50}$ (Table 1).

Latex Viscosity and Shear Thinning

Latex viscosity was measured using a Brookfield viscometer with spindle No. 6. Viscosity data were taken for 1, 10 and 20 rpm. As usual the latex viscosity is given for 20 rpm (Bf 20) in mPas. To characterize the non-Newtonian behavior a shear thinning factor SF is calculated from the viscosity at 1 and 10 rpm: $SF=(Bf1/Bf10)-1$. All measurements were done for temperature stored samples at 23° C.

Woodworking Adhesive Formulation

Base latices, which were polymerized as given above, were formulated to provide the woodworking adhesive formulation. Butyl diglycol acetate was used as a film forming agent (2,6 parts for 100 parts of latex) and aluminum chloride hydrate was used as a catalyst (3.5 parts of a 50% solution for 100 parts of emulsion). The mixing of the components was done at ambient temperature. The gluing of the wood specimens was executed within 1 to 5 days after the formulation was finished.

Bond Strength in Accordance to DIN EN 204/205

Test specimens were produced in accordance with DIN EN 205. For this purpose pairs of beechwood panels, each 5 mm thick, 130 mm wide and 600 mm long, were bonded to one another with the adhesive formulation to be tested under a pressure distributed uniformly over the bond area and were stored in accordance with DIN EN 204: For testing for allocation to performance group D3, the specimens, after gluing, were stored under standard climatic conditions (23° C., 50% atmospheric humidity) for 7 days and then stored in cold water at 23° C. for 4 days. After this storage, the bonded panels were divided into test specimens each measuring 150 mm in length. These test specimens was followed to determine the bond strength in the tensile shear test, in which the bonded specimens were pulled apart using a tensile testing machine at a pulling rate at 50 mm/min and were stressed until they broke. The maximum force $F_{max}$ which occurred upon fracture was determined. The bond strength (D3 value) is calculated in accordance with DIN EN 205 from $F_{max}/A$, where A is the bonded test area. To fulfill the requirements of performance group D3 this bond strength has to be $D3 \geq 2$ N/mm².

Testing for Thermal Stability in Accordance with WATT 91

As test specimens pairs of beechwood panels each 5 mm thick, 125 mm wide and 325 mm long were bonded to one another using the adhesive dispersion tested, under a pressure distributed uniformly over the bond area. Following storage, the bonded panels were divided into test specimens each measuring 150 mm in length and 20 mm in width. After the test specimens had been prepared they were stored at a temperature of 80° C. in an oven preheated to 80° C. Directly following hot storage, the thermal stability or heat resistance was determined in the tensile shear test DIN EN 205, in which the bonded test specimens were pulled apart using a tensile testing machine at a pulling speed of 50 mm/min and were stressed until they broke. The maximum force $F_{max}$ which occurred upon fracture was determined. The heat resistance WATT 91 is calculated from $F_{max}/A$, where A is the bonded test area. To fulfill the requirements for a high performance glue the heat resistance has to be $\geq 7.0$ N/mm$^2$.

Testing the Setting Properties

In a manner similar to the procedure for testing the bond strength, pairs of oak panels each 5 mm thick, 20 mm wide and 150 mm long were bonded to one another using the adhesive dispersions to be tested, with a pressure which was distributed uniformly over the bond area, and the bond strength was determined in the tensile shear test after a setting time of 20 minutes, after which the bonded test specimens were pulled apart using a tensile testing machine at a pulling speed of 50 mm/min and were stressed until they broke. The maximum force $F_{max}$ which occurred upon fracture was determined, and was used to determine the bond strength at setting time as a measurement for the setting speed $F_{max}/A$, where A is the bonded test area. To fulfill the requirements for a high performance fast setting glue the setting speed has to be $\geq 6.5$ N/mm$^2$.

Results

Figure 2:
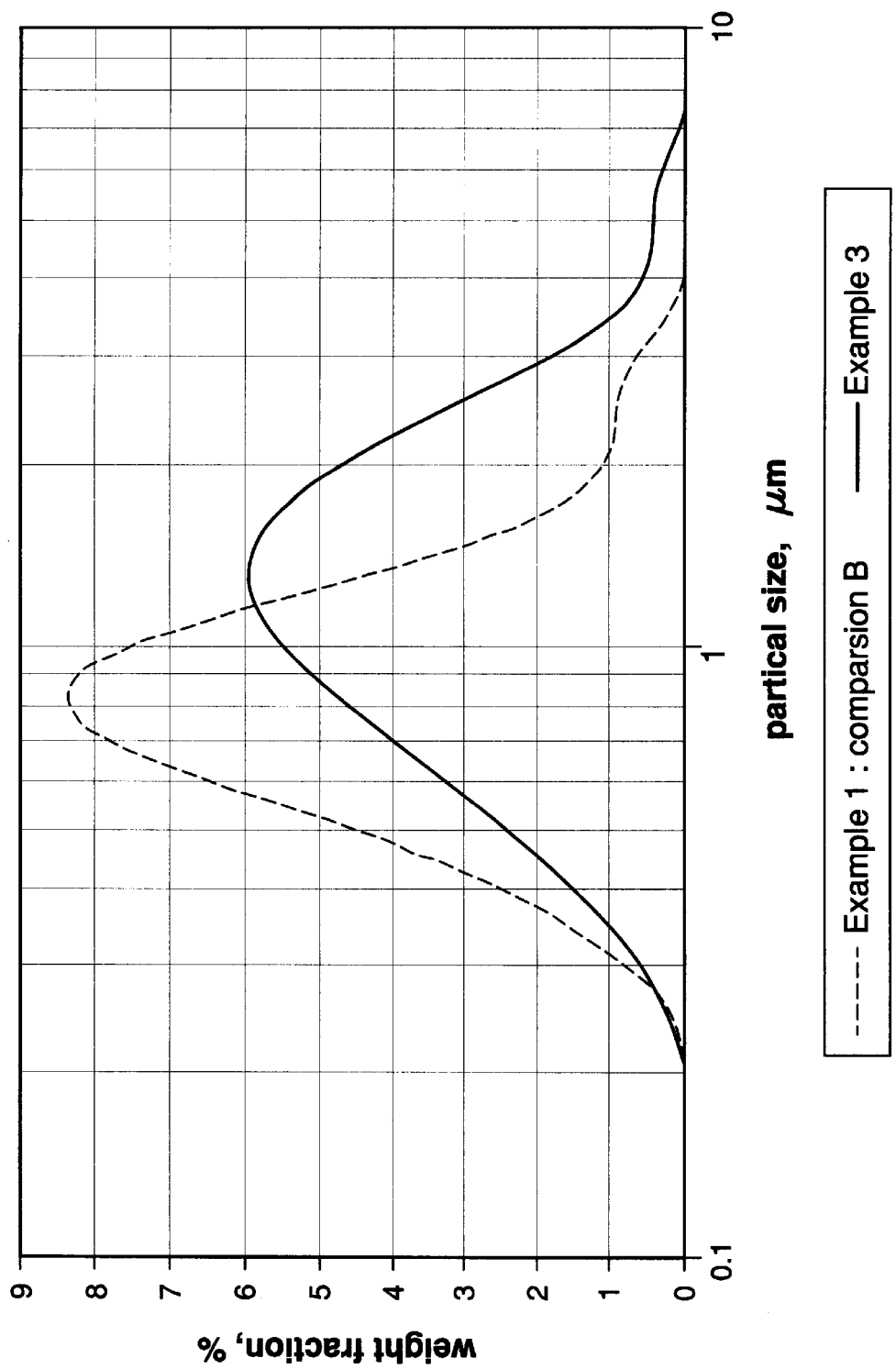

In Table 1 the results for the nine products produced by the recipes given above are summarized. Additionally, FIG. 1 illustrates the particle size distributions as obtained from measurements using the Coulter LS230 for examples 2, 5, 6 and 7 using AMA as the pre-crosslinking monomer. FIG. 2 gives the particle size distributions obtained for examples 1 and 3 using TAC as the pre-crosslinking monomer.

It is obvious from these results that the use of small amounts of a pre-crosslinking agent (less than 0.01% based on total monomer) enables an increased final latex particle size, a decreased shear thinning and an increased speed of set. Other important properties of woodworking adhesives, such as viscosity (Bf 20), water resistance (D3 value) and heat resistance (WATT 91) are unchanged within the experimental reproducibility. When using pre-crosslinking agents in amounts of above 0.01% (examples 8 and 9) the speed of set is reduced considerably, whereas the shear thinning becomes too low. This is especially demonstrated by example 8 for which the negative SF value indicates some shear thickening or dilatancy. As can be seen from Examples 4 to 7 the effects are dosage dependent with countercurrent tendency for particle size and shear thinning.

The comparison of the results for examples 3 and 4 as well as for examples 8 and 9 yields to the conclusion that the tri-functional TAC is more effective for reducing the particle size and thus the shear thinning compared to the bi-functional AMA.

Figure 3:
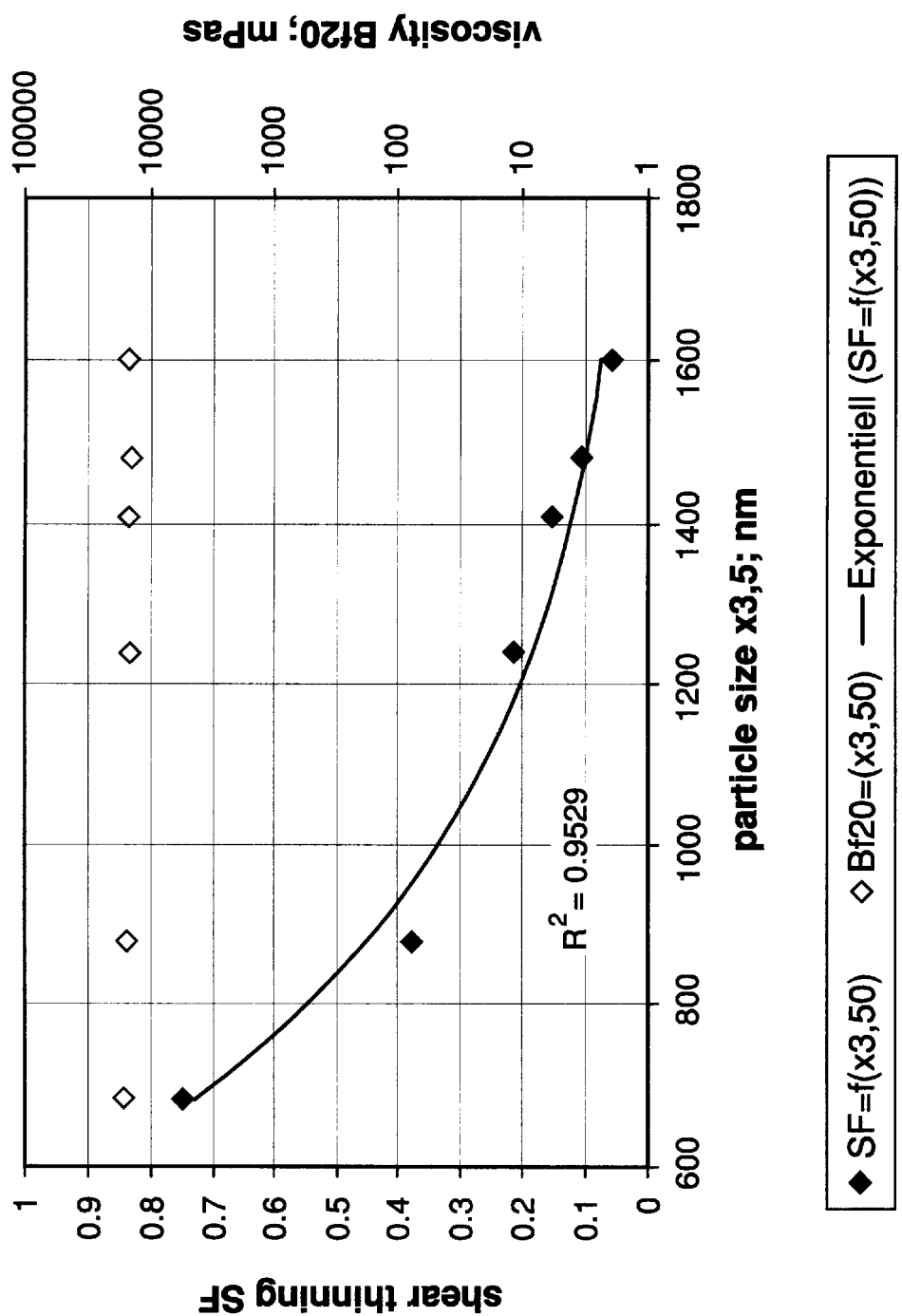
FIG. 3 is a graph showing dependency of sheer thinning on particle size for the latices of examples 2, 4 to 7 and 9

FIG. 1 shows the particle size distribution for examples 2 (for comparison), 4, 5, 6, and 7 as obtained from measurements using the coulter LS230. As can be seen from the graph, the polymer latex of comparative example 2 has a particle size mode below 1 micrometer. In contrast to this, the polymer latices of the invention (examples 4, 5, 6, and 7) have mode particle sizes above 1 micrometer, showing a considerable increase in particle size for the polymer latices of the invention. The same comparison is made in FIG. 2 for comparative example 1 and invention example 3 using TAC. FIG. 3 shows the decrease of shear thinning with increasing particle size $x_{3,50}$ for examples 2, 4, 5, 6, 7 and 9 indicating a strong correlation (correlation coefficient $R^2=0.95$) whereas the viscosity (Bf 20) itself remains more or less unchanged.

Although having been described by reference to preferred embodiments above, the invention is not limited to these embodiments. It will be clear that various changes and modifications may be made in the embodiment of the invention described above, without departing from the scope of the invention as defined in the claims. It is therefore intended that all matter disclosed in the foregoing description shall be interpreted as illustrative only and not as limitation of the invention.

| Example | Pre-crosslinking monomer | Amount of pre-crosslinking monomer (ppm) | Particle size, $x_{3,50}$ nm | viscosity Bf20 mPas | shear thinning, SF | setting speed N/mm$^2$ | water-resistance, D3, N/mm$^2$ | heat resistance, WATT 91, N/mm$^2$ |
|---|---|---|---|---|---|---|---|---|
| 1 | — | — | 776 | 16500 | 0.61 | 6.9 | 3.6 | 7.5 |
| 2 | — | — | 683 | 16950 | 0.75 | 7.2 | 3.2 | 7.0 |
| 3 | TAC | 10 | 1141 | 15250 | 0.28 | 6.7 | 3.5 | 7.6 |
| 4 | AMA | 10 | 879 | 16500 | 0.38 | 7.3 | 3.1 | 7.2 |
| 5 | AMA | 50 | 1241 | 15900 | 0.22 | 7.6 | 2.9 | 7.3 |
| 6 | AMA | 75 | 1409 | 16250 | 0.16 | 7.1 | 3.4 | 7.4 |
| 7 | AMA | 90 | 1482 | 15750 | 0.11 | 7.8 | 3.2 | 7.6 |
| 8 | TAC | 300 | 2654 | 17150 | −0.12 | 4.5 | 3.7 | 7.5 |
| 9 | AMA | 300 | 1602 | 16750 | 0.06 | 5.2 | 3.2 | 7.2 |

What is claimed is:

1. A vinyl acetate based polymer latex composition obtained by emulsion polymerization, the polymer comprising
   (i) PVOH, and
   (ii) a monomer mixture, said monomer mixture comprising
       vinyl acetate, and
       a pre-crosslinking monomer selected from one or more polyethylenically unsaturated compounds wherein said pre-crosslinking monomer is present in amount of less than 0.01% by weight based on the total monomer content and which pre-crosslinking monomer is initially charged to the polymerization reaction mixture.

2. The vinyl acetate based polymer latex composition of claim 1, wherein the pre-crosslinking monomer is selected from the group consisting of decadiene, vinyl crotonate, diallyl phthalate, divinyl adipate, methylene bis(meth)acrylamide, triallyl cyanurate, butanediol di(meth)acrylate, hexanediol di(meth)acrylate, pentaerythritol tri-(meth)

acrylate, pentaerythritol di(meth)acrylate, triethylolpropane tri(meth)acrylate, triethylolpropane di(meth)acrylate, divinyldimethylsilane, triethylene glycol di(meth)-acrylate, allyl(meth)acrylate and mixtures thereof.

3. The vinyl acetate based polymer latex composition of claim 2, wherein the pre-crosslinking monomer is selected from allylmethacrylate, triallyl cyanurate and mixtures thereof.

4. The vinyl acetate based polymer latex composition of claim 1 further comprising a post-crosslinking monomer selected from the group consisting of N-alkylol derivatives of an amide of an α,β-ethylenically unsaturated carboxylic acids and mixtures thereof.

5. The vinyl acetate based polymer latex composition of claim 4, wherein the post-crosslinking monomer is selected from the group consisting of N—$C_{1-3}$-alkylol (meth) acrylamides, N—$C_{1-3}$-alkylol melamide, N—$C_{1-3}$-alkylol melamic acid or ester, N—$C_{2-5}$-acylol amides of vinylaromatic acids, N—$C_{1-4}$-alkoxymethyl (meth)-acrylamide, and mixtures thereof.

6. The vinyl acetate based polymer latex composition of claim 5, wherein the post-crosslinking monomer is N-methylol acrylamide.

7. The vinyl acetate based polymer latex composition of claim 4, wherein the post-crosslinking monomer is comprised in an amount of 0.1 to 5.0% by weight based on the total monomer content.

8. The vinyl acetate based polymer latex composition of claim 1, further comprising one or more copolymerizable comonomers selected from up to 40% by weight another vinylic ester, up to 15% by weight acrylic monomer, up to 3% by weight unsaturated carboxylic acid, and up to 20% by weight ethylene, all percentages being based on total monomer content.

9. The vinyl acetate based polymer latex composition of claim 8, comprising one or both of 1 to 20% by weight ethylene and 1 to 30% by weight vinyl ester as the copolymerizable comonomer, provided the total amount of copolymerizable co-monomer does not exceed 1 to 40% by weight.

10. The vinylacetate based polymer latex composition of claim 1 comprising 3 to 15% by weight PVOH.

11. The vinyl acetate based polymer latex composition of claim 10, wherein the PVOH has a degree of hydrolysis of from 85 to 97 mole %.

12. A vinyl acetate based polymer latex composition obtained by emulsion polymerization, the polymer comprising (i) PVOH, and (ii) a monomer mixture, said monomer mixture comprising vinyl acetate, pre-crosslinking monomer selected from one or more polyethylenically unsaturated compounds wherein said pre-crosslinking monomer is present in amount of less than 0.01% by weight based on the total monomer content, and which pre-crosslinking monomer is initially charged to the polymerization reaction mixture, and a post crosslinking monomer in an amount of 0.1 to 5.0% by weight, based on the total monomer content.

13. The vinyl acetate based polymer latex composition of claim 12, wherein the pre-crosslinking monomer is AMA or TAC, and the post-crosslinking monomer is NMA.

14. The vinyl acetate based polymer composition of claim 13, wherein the PVOH has a degree of hydrolysis of from 85 to 97 mole %.

15. The vinyl acetate based polymer latex composition of claim 12, further comprising one or more copolymerizable comonomers selected from up to 40% by weight another vinylic ester, up to 15% by weight (meth)acrylic monomer, up to 3% by weight unsaturated carboxylic acid, and up to 20% by weight ethylene, all percentages being based on total monomer content.

16. An adhesive comprising a vinyl acetate based polymer latex composition obtained by emulsion polymerization, the polymer comprising (i) PVOH, and (ii) a monomer mixture, said monomer mixture comprising vinyl acetate, and a pre-crosslinking monomer selected from one or more polyethylenically unsaturated compounds wherein said pre-crosslinking monomer is present in amount of less than 0.01% by weight based on the total monomer content, and which pre-crosslinking monomer is initially charged to the polymerization reaction mixture, further optionally comprising: a post-crosslinking monomer, up to 40% by weight of another vinylic ester, up to 15% by weight of (meth)acrylic monomer, up to 3% by weight of unsaturated carboxylic acid, and up to 20% by weight of ethylene, all percentages being based on total monomer content, optionally in combination with appropriate additives.

17. The adhesive of claim 16 which is a woodworking adhesive.

18. In a vinyl acetate based polymer latex suited for use in formulating a wood glue wherein a monomer mixture comprised of vinyl acetate and N-methylol acrylamide, are polymerized in the presence of polyvinyl alcohol protective colloid, the improvement which comprises incorporating allyl methacrylate or triallyl cyanurate in the monomer mixture in an amount of from 2 to 90 ppm.

* * * * *